US011751130B2

(12) United States Patent
Won et al.

(10) Patent No.: US 11,751,130 B2
(45) Date of Patent: Sep. 5, 2023

(54) APPARATUS, METHOD AND COMPUTER PROGRAM

(71) Applicant: NOKIA TECHNOLOGIES OY, Espoo (FI)

(72) Inventors: Sung Hwan Won, Gwangju (KR); Alessio Casati, Surrey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 200 days.

(21) Appl. No.: 17/429,466

(22) PCT Filed: Feb. 8, 2019

(86) PCT No.: PCT/EP2019/053122
§ 371 (c)(1),
(2) Date: Aug. 9, 2021

(87) PCT Pub. No.: WO2020/160783
PCT Pub. Date: Aug. 13, 2020

(65) Prior Publication Data
US 2022/0110050 A1    Apr. 7, 2022

(51) Int. Cl.
*H04W 48/18* (2009.01)
*H04W 8/12* (2009.01)
*H04W 12/06* (2021.01)
*H04W 60/06* (2009.01)

(52) U.S. Cl.
CPC ............. *H04W 48/18* (2013.01); *H04W 8/12* (2013.01); *H04W 12/06* (2013.01); *H04W 60/06* (2013.01)

(58) Field of Classification Search
CPC ....... H04W 48/18; H04W 8/12; H04W 12/06; H04W 60/06; H04W 4/00; H04W 8/18; H04W 60/00; H04L 63/0892
See application file for complete search history.

(56) References Cited

U.S. PATENT DOCUMENTS

2020/0008167 A1* 1/2020 Venkataraman ...... H04W 76/16
2022/0007184 A1* 1/2022 Ferdi ..................... H04W 12/08

OTHER PUBLICATIONS

3rd Generation Partnership Project; Technical Specification Group Services and System Aspects; Study on Enhancement of Network Slicing (Release 16), (Dec. 2018) 3GPP TR 23.740 V16.0.0, pp. 58-59 (Year: 2018).*
International Search Report and Written Opinion dated Aug. 16, 2019 corresponding to International Patent Application No. PCT/EP2019/053122.

(Continued)

*Primary Examiner* — Brandon J Miller
(74) *Attorney, Agent, or Firm* — SQUIRE PATTON BOGGS (US) LLP

(57) ABSTRACT

There is provided an apparatus. The apparatus comprises means for performing: participating in a slice-specific authentication and authorization procedure for the apparatus; and receiving a message at the apparatus, the message comprising an information element indicating to a mobility management sub-layer of the apparatus a result of the slice-specific authentication and authorization procedure, and the message comprising single network slice selection assistance information for the apparatus.

18 Claims, 7 Drawing Sheets

(56) References Cited

OTHER PUBLICATIONS

3GPP TR 23.740 V16.0.0 (Dec. 2018), Technical Report, 3rd Generation Partnership Project; Technical Specification Group Services and System Aspects; Study on Enhancement of Network Slicing (Release 16), Dec. 2018.
3GPP TR 23.740 V1.0.0 (Dec. 2018), Technical Report, 3rd Generation Partnership Project; Technical Specification Group Services and System Aspects; Study on Enhancement of Network Slicing (Release 16), Dec. 2018.
3GPP TS 23.502 V15.4.1 (Jan. 2019), Technical Specification, 3rd Generation Partnership Project; Technical Specification Group Services and System Aspects; Procedures for the 5G System; Stage 2 (Release 15), Jan. 2019.
3GPP TS 24.501 V15.2.1 (Jan. 2019), Technical Specification, 3rd Generation Partnership Project; Technical Specification Group Core Network and Terminals; Non-Access-Stratum (NAS) protocol for 5G System (5GS); Stage 3 (Release 15), Jan. 2019.
B. Aboba et al., "Extensible Authentication Protocol (EAP)," IETF RFC 3748, Network Working Group, Jun. 2004.

\* cited by examiner

APPARATUS, METHOD AND COMPUTER PROGRAM

FIELD

This disclosure relates to communications, and more particularly to an apparatus, method and computer program in a wireless communication system. More particularly the present invention relates to registration and authentication procedure in a network.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) access and a further development thereof which is sometimes referred to as LTE Advanced (LTE-A).

Since introduction of fourth generation (4G) services increasing interest has been paid to the next, or fifth generation (5G) standard. 5G may also be referred to as a New Radio (NR) network. Standardization of 5G or New Radio networks has been finalized in 3GPP release 15.

Network slicing is a form of virtual network architecture which allows multiple virtual networks to be created on top of a common shared physical infrastructure. For example a single physical network may be sliced in to multiple virtual networks that can support different radio access networks (RANs), or different service types operating across a single RAN.

STATEMENT OF INVENTION

According to a first aspect there is provided an apparatus comprising means for performing: participating in a slice-specific authentication and authorization procedure for the apparatus; and receiving a message at the apparatus, the message comprising an information element indicating to a mobility management sub-layer of the apparatus a result of the slice-specific authentication and authorization procedure, and the message comprising single network slice selection assistance information for the apparatus.

According to an example the mobility management sub-layer comprises a 5G system mobility management sub-layer.

According to an example the means are further configured to perform receiving an indication of when a relocation of an access and mobility function is required in association with the single network slice selection assistance information received at the apparatus.

According to an example the means are further configured to perform delaying initiation of a protocol data unit session establishment at the apparatus until the relocation of the access and mobility function is completed.

According to an example the receiving a result of the slice-specific authentication and authorization procedure comprises receiving an indication of success or failure of the authentication and authorization procedure.

According to an example, in a roaming case the result includes the single network slice selection assistance information used in a Visited Public Land Mobile Network that maps to the single network slice selection assistance information of a Home Public Land Mobile Network which is subject to the authentication and authorization procedure.

According to an example the means are further configured to perform adding the single network slice selection assistance information for the apparatus to a list of any already allowed network slice selection assistance information for the apparatus, when the result indicates success of the authentication and authorization procedure.

According to an example the single network slice selection assistance information added to the list is a value used in a Visited Public Land Mobile Network that maps to the single network slice selection assistance information of a Home Public Land Mobile Network.

According to an example the means are further configured to associate the single network slice selection assistance information with a mapped single network slice selection assistance information of a Home Public Land Mobile Network, when the apparatus is roaming.

According to an example the means are further configured to perform the adding the single network slice selection assistance information for the apparatus at the mobility management sub-layer of the apparatus.

According to an example the means are further configured to perform the adding the single network slice selection assistance information for the apparatus at the mobility management sub-layer of the apparatus without forwarding the single network slice selection assistance information to an upper layer of the apparatus.

According to an example the means are further configured to perform removing the single network slice selection assistance information for the apparatus from a list of any already allowed network slice selection assistance information for the apparatus, when the result indicates failure of the authentication and authorization procedure.

According to an example the means are further configured to perform the removing the single network slice selection assistance information for the apparatus at the mobility management sub-layer of the apparatus.

According to an example the means are further configured to perform the removing the single network slice selection assistance information for the apparatus at the mobility management sub-layer of the apparatus without forwarding the single network slice selection assistance information to an upper layer of the apparatus.

According to an example the means are further configured to perform locally releasing a protocol data unit session associated with the single network slice selection assistance information for the apparatus, when the result indicates success of the authentication and authorization procedure.

According to an example the means are further configured to perform participating in a registration procedure for registering the apparatus in the network, wherein completion of the registration procedure is independent of completion of the slice-specific authentication and authorization procedure.

According to an example means are further configured to perform the slice-specific authentication and authorization procedure after completion of the registration procedure.

According to an example the means are further configured to perform the slice-specific authentication and authorization procedure during the registration procedure.

According to an example the means are further configured to perform operating a first timer associated with the registration procedure and a second timer associated with the slice-specific authentication and authorization procedure.

According to an example the means are further configured to perform determining that the slice-specific authentication and authorization procedure has failed when the second timer expires.

According to an example the means are further configured to perform pausing the first timer when the second timer is started, and resuming the first timer when the second timer expires.

According to an example the means comprises at least one processor; and at least one memory including computer program code, the at least one memory and computer program code configured to, with the at least one processor, cause the performance of the apparatus.

According to a second aspect there is provided an apparatus comprising: participating circuitry for participating in a slice-specific authentication and authorization procedure for the apparatus; and receiving circuitry for receiving a message at the apparatus, the message comprising an information element indicating to a mobility management sub-layer of the apparatus a result of the slice-specific authentication and authorization procedure, and the message comprising single network slice selection assistance information for the apparatus.

According to a third aspect there is provided a method comprising: participating in a slice-specific authentication and authorization procedure for an apparatus; and receiving a message at the apparatus, the message comprising an information element indicating to a mobility management sub-layer of the apparatus a result of the slice-specific authentication and authorization procedure, and the message comprising single network slice selection assistance information for the apparatus.

According to an example the mobility management sub-layer comprises a 5G system mobility management sub-layer.

According to an example the method comprises receiving an indication of when a relocation of an access and mobility function is required in association with the single network slice selection assistance information received at the apparatus.

According to an example the method comprises delaying initiation of a protocol data unit session establishment at the apparatus until the relocation of the access and mobility function is completed.

According to an example the receiving a result of the slice-specific authentication and authorization procedure comprises receiving an indication of success or failure of the authentication and authorization procedure.

According to an example the method comprises adding the single network slice selection assistance information for the apparatus to a list of any already allowed network slice selection assistance information for the apparatus, when the result indicates success of the authentication and authorization procedure.

According to an example, in a roaming case the single network slice selection assistance information added to the list is a value used in a Visited Public Land Mobile Network that maps to the single network slice selection assistance information of a Home Public Land Mobile Network.

According to an example the method comprises associating the single network slice selection assistance information with a mapped single network slice selection assistance information of a Home Public Land Mobile Network, when the apparatus is roaming.

According to an example the method comprises adding the single network slice selection assistance information for the apparatus at the mobility management sub-layer of the apparatus.

According to an example the method comprises adding the single network slice selection assistance information for the apparatus at the mobility management sub-layer of the apparatus without forwarding the single network slice selection assistance information to an upper layer of the apparatus.

According to an example the method comprises removing the single network slice selection assistance information for the apparatus from a list of any already allowed network slice selection assistance information for the apparatus, when the result indicates failure of the authentication and authorization procedure.

According to an example the method comprises removing the single network slice selection assistance information for the apparatus at the mobility management sub-layer of the apparatus.

According to an example the method comprises removing the single network slice selection assistance information for the apparatus at the mobility management sub-layer of the apparatus without forwarding the single network slice selection assistance information to an upper layer of the apparatus.

According to an example the method comprises locally releasing a protocol data unit session associated with the single network slice selection assistance information for the apparatus, when the result indicates success of the authentication and authorization procedure.

According to an example the method comprises participating in a registration procedure for registering the apparatus in the network, wherein completion of the registration procedure is independent of completion of the slice-specific authentication and authorization procedure.

According to an example the method comprises performing the slice-specific authentication and authorization procedure after completion of the registration procedure.

According to an example the method comprises performing the slice-specific authentication and authorization procedure during the registration procedure.

According to an example the method comprises operating a first timer associated with the registration procedure and a second timer associated with the slice-specific authentication and authorization procedure.

According to an example the method comprises determining that the slice-specific authentication and authorization procedure has failed when the second timer expires.

According to an example the method comprises pausing the first timer when the second timer is started, and resuming the first timer when the second timer expires.

According to a fourth aspect there is provided a computer program comprising instructions for causing an apparatus to perform at least the following: participating in a slice-specific authentication and authorization procedure for the apparatus; and receiving a message at the apparatus, the message comprising an information element indicating to a mobility management sub-layer of the apparatus a result of the slice-specific authentication and authorization procedure, and the message comprising single network slice selection assistance information for the apparatus.

According to a fifth aspect there is provided a computer program comprising instructions stored thereon for performing at least the following: participating in a slice-specific authentication and authorization procedure for an apparatus; and receiving a message at the apparatus, the message comprising an information element indicating to a mobility management sub-layer of the apparatus a result of the slice-specific authentication and authorization procedure, and the message comprising single network slice selection assistance information for the apparatus.

According to a sixth aspect there is provided a non-transitory computer readable medium comprising program instructions for causing an apparatus to perform at least the following: participating in a slice-specific authentication and authorization procedure for an apparatus; and receiving a message at the apparatus, the message comprising an information element indicating to a mobility management sub-layer of the apparatus a result of the slice-specific authentication and authorization procedure, and the message comprising single network slice selection assistance information for the apparatus.

According to a seventh aspect there is provided a non-transitory computer readable medium comprising program instructions stored thereon for performing at least the following: participating in a slice-specific authentication and authorization procedure for an apparatus; and receiving a message at the apparatus, the message comprising an information element indicating to a mobility management sub-layer of the apparatus a result of the slice-specific authentication and authorization procedure, and the message comprising single network slice selection assistance information for the apparatus.

According to an eighth aspect there is provided an apparatus comprising means for performing: participating in a slice-specific authentication and authorization procedure for a user equipment; and sending a message to the user equipment, the message comprising an information element indicating to a mobility management sub-layer of the user equipment a result of the slice-specific authentication and authorization procedure, and the message comprising single network slice selection assistance information for the user equipment.

According to an example the mobility management sub-layer comprises a 5G system mobility management sub-layer.

According to an example the means are further configured to perform providing an indication to the user equipment of when a relocation of the apparatus is required in association with the single network slice selection assistance information provided to the user equipment.

According to an example the means are further configured to perform providing mapped single network slice selection assistance information of a home public land mobile network for the user equipment, when the user equipment is roaming.

According to an example the providing a result of the slice-specific authentication and authorization procedure to the user equipment comprises indicating success or failure of the authentication and authorization procedure.

According to an example the means are further configured to perform causing adding the single network slice selection assistance information for the user equipment to a list of any already allowed network slice selection assistance information for the user equipment, when the result indicates success of the authentication and authorization procedure.

According to an example the means are further configured to perform causing removing the single network slice selection assistance information for the user equipment from a list of any already allowed network slice selection assistance information for the user equipment, when the result indicates failure of the authentication and authorization procedure.

According to an example the means are further configured to indicate to a session management function failure of the authentication and authorization procedure for the user equipment and the single network slice selection assistance information, when the authentication and authorization procedure fails.

According to an example the means are further configured to perform participating in a registration procedure for registering the user equipment in the network, wherein completion of the registration procedure is independent of completion of the slice-specific authentication and authorization procedure.

According to an example the means are further configured to perform the slice-specific authentication and authorization procedure after completion of the registration procedure.

According to an example the means are further configured to perform the slice-specific authentication and authorization procedure during the registration procedure.

According to an example the means comprises at least one processor; and at least one memory including computer program code, the at least one memory and computer program code configured to, with the at least one processor, cause the performance of the apparatus.

According to a ninth aspect there is provided an apparatus comprising participating circuitry for participating in a slice-specific authentication and authorization procedure for a user equipment; and sending circuitry for sending a message to the user equipment, the message comprising an information element indicating to a mobility management sub-layer of the user equipment a result of the slice-specific authentication and authorization procedure, and the message comprising single network slice selection assistance information for the user equipment.

According to a tenth aspect there is provided a method comprising: participating in a slice-specific authentication and authorization procedure for a user equipment; and sending a message to the user equipment, the message comprising an information element indicating to a mobility management sub-layer of the user equipment a result of the slice-specific authentication and authorization procedure, and the message comprising single network slice selection assistance information for the user equipment.

According to an example the mobility management sub-layer comprises a 5G system mobility management sub-layer.

According to an example the method comprises providing an indication to the user equipment of when a relocation of the apparatus is required in association with the single network slice selection assistance information provided to the user equipment.

According to an example the method comprises providing mapped single network slice selection assistance information of a home public land mobile network for the user equipment, when the user equipment is roaming.

According to an example the providing a result of the slice-specific authentication and authorization procedure to the user equipment comprises indicating success or failure of the authentication and authorization procedure.

According to an example the method comprises causing adding the single network slice selection assistance information for the user equipment to a list of any already allowed network slice selection assistance information for the user equipment, when the result indicates success of the authentication and authorization procedure.

According to an example the method comprises causing removing the single network slice selection assistance information for the user equipment from a list of any already allowed network slice selection assistance information for the user equipment, when the result indicates failure of the authentication and authorization procedure.

According to an example the method comprises indicating to a session management function failure of the authentication and authorization procedure for the user equipment and the single network slice selection assistance information, when the authentication and authorization procedure fails.

According to an example the method comprises participating in a registration procedure for registering the user equipment in the network, wherein completion of the registration procedure is independent of completion of the slice-specific authentication and authorization procedure.

According to an example the method comprises performing the slice-specific authentication and authorization procedure after completion of the registration procedure.

According to an example the method comprises performing the slice-specific authentication and authorization procedure during the registration procedure.

According to an eleventh aspect there is provided a computer program comprising instructions for causing an apparatus to perform at least the following: participating in a slice-specific authentication and authorization procedure for a user equipment; and sending a message to the user equipment, the message comprising an information element indicating to a mobility management sub-layer of the user equipment a result of the slice-specific authentication and authorization procedure, and the message comprising single network slice selection assistance information for the user equipment.

According to a twelfth aspect there is provided a computer program comprising instructions stored thereon for performing at least the following: participating in a slice-specific authentication and authorization procedure for a user equipment; and sending a message to the user equipment, the message comprising an information element indicating to a mobility management sub-layer of the user equipment a result of the slice-specific authentication and authorization procedure, and the message comprising single network slice selection assistance information for the user equipment.

According to a thirteenth aspect there is provided a non-transitory computer readable medium comprising program instructions for causing an apparatus to perform: participating in a slice-specific authentication and authorization procedure for a user equipment; and sending a message to the user equipment, the message comprising an information element indicating to a mobility management sub-layer of the user equipment a result of the slice-specific authentication and authorization procedure, and the message comprising single network slice selection assistance information for the user equipment.

According to a fourteenth aspect there is provided a non-transitory computer readable medium comprising program instructions stored thereon for performing: participating in a slice-specific authentication and authorization procedure for a user equipment; and sending a message to the user equipment, the message comprising an information element indicating to a mobility management sub-layer of the user equipment a result of the slice-specific authentication and authorization procedure, and the message comprising single network slice selection assistance information for the user equipment.

BRIEF DESCRIPTION OF FIGURES

The invention will now be described in further detail, by way of example only, with reference to the following examples and accompanying drawings, in which.

DETAILED DESCRIPTION

3GPP TR 23.740 is a Study on Enhancement of Network Slicing. TR 23.740 describes procedures to enable slice-specific authentication and authorization (A&A). "Key Issue #3" raised at point 5.3 of TR 23.740 is how to provide Network Slice Access authentication and authorization specific for the Network Slice Access authorization that uses User Identities and Credentials different from the 3GPP SUPI and that takes place after the primary authentication which is still required between the UE and the 5GS for PLMN access authorization and authentication. The currently preferred solution proposes to "interrupt" the standard UE registration procedure to check if, for one or more network slices, an (additional) slice-specific A&A procedure has to be performed. If this is the case, all necessary steps for this slice-specific A&A procedure are performed, and afterwards standard UE registration is resumed and continued.

Figure 1:
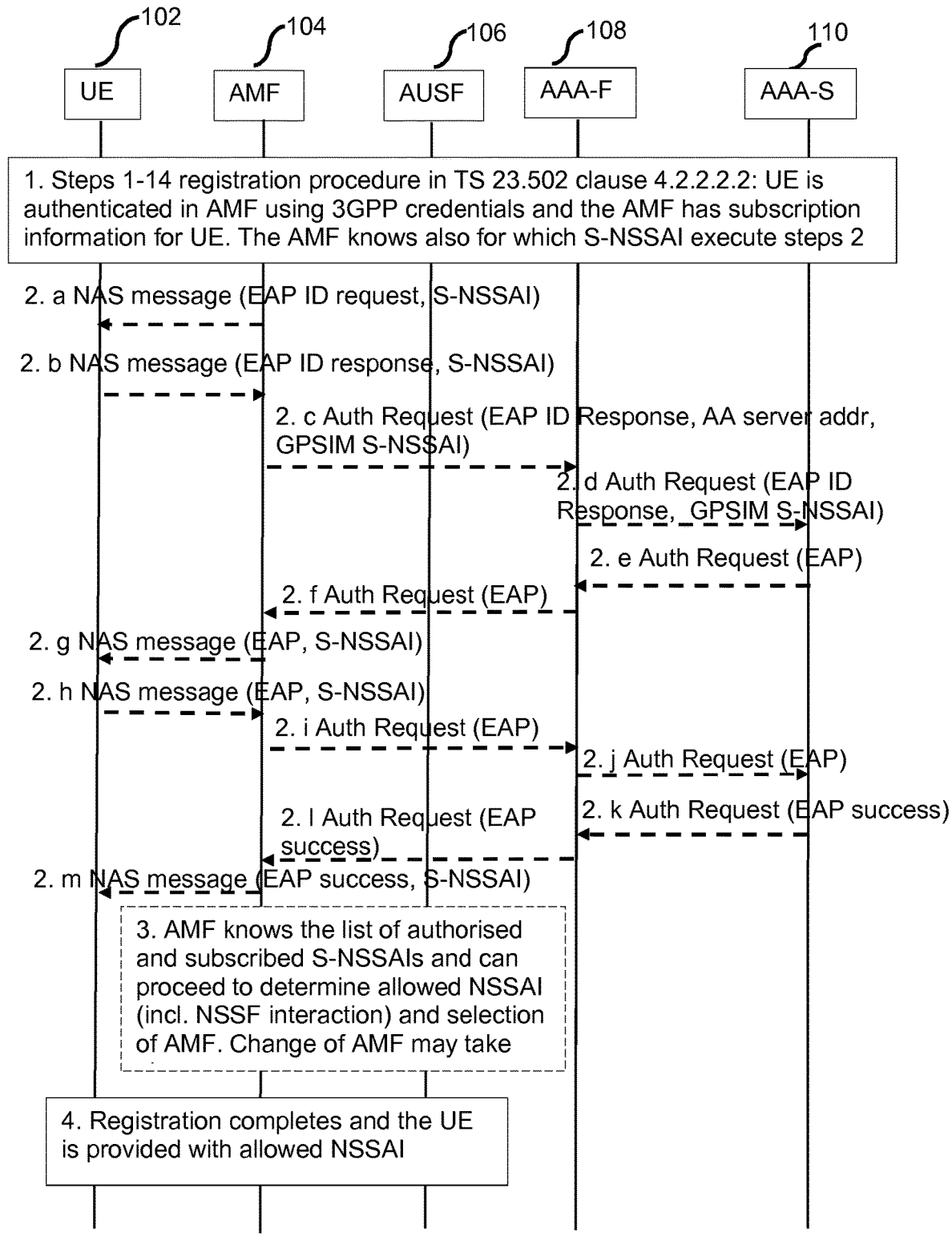
FIG. 1 shows a schematic example of a wireless communication system where the invention may be implemented.

This is shown in the signaling diagram of FIG. 1, which shows signaling between a UE 102, an access and mobility management function (AMF) 104; an Authentication Server Function (AUSF) 106; Authentication, Authorization, and Accounting Proxy Function (AAA-F) 108; and Authentication, Authorization, and Accounting Server (AAA-S) 110.

According to FIG. 1 the UE 102 should suspend a timer (which is started in Step 1), when the UE receives the non-access stratum (NAS) message in Step 2.*a* from the AMF 104. The UE should then resume the timer when the UE receives the NAS message in Step 2.*m* from AMF 104. If the timer expires, then the UE resumes the timer. The timer may for example be a T3510 timer.

The inventors have identified at least two problems with the currently proposed solution.

In terms of a first problem, as discussed above for the standard UE registration procedure a timer is started. This timer is used so that, in case for some reason the standard registration procedure fails (e.g. if messages are dropped), the UE (or the network) will abort the current registration procedure and start (or wait for) a new registration procedure when the timer expires. In the proposed slice-specific A&A (which is performed during normal UE registration) this timer is paused, simply because the additional steps for slice-specific A&A may take some time. When slice-specific A&A is completed (and standard UE registration is resumed), the timer is also resumed. A problem with the current solution shown in FIG. 1 is that, for abnormal cases (i.e. when the slice-specific A&A procedure fails, such as the message at step 2.*m* being lost), then the slice-specific A&A will never finish, the procedure will never go back to standard UE registration and the timer will never be resumed. Thus, the UE and network will be stuck in "deadlock".

In terms of a second problem, the standard UE registration procedure and the slice-specific A&A procedure are coupled. This is a problem from a NAS layer perspective as, firstly, a "mixture" of procedures is counter to 5G design principles as all procedures are considered to be independent from one another. Secondly, as the slice-specific A&A procedure is, according to the current proposal, performed during the standard UE registration procedure, a further, additional slice-specific A&A procedure (that may for some reasons be necessary later-on for some network slices) cannot be performed without complete deregistration (and re-registration) of the UE.

Accordingly in the present disclosure a new approach is proposed. In the disclosed approach, both procedures (i.e. standard UE registration procedure and slice-specific A&A procedure) are "de-coupled". In other words both procedures are made independent from one another. This overcomes or at least mitigates the second problem discussed above.

Furthermore, the present disclosure proposes introducing a new (second) timer. The (first) timer of the standard registration procedure is paused as before. The disclosure proposes a second timer that is started for the slice-specific A&A procedure. If there are no problems with the slice-specific A&A, then the process goes back to standard UE registration procedure and the first timer is resumed as before. On the other hand if the slice-specific A&A fails (i.e. abnormal case), the second timer will expire. Then (with a failed slice-specific A&A), the process will still go back to standard UE registration and the first timer would still be resumed. Thus, no deadlock will occur.

This is explained in more detail in the examples below.

Figure 2:
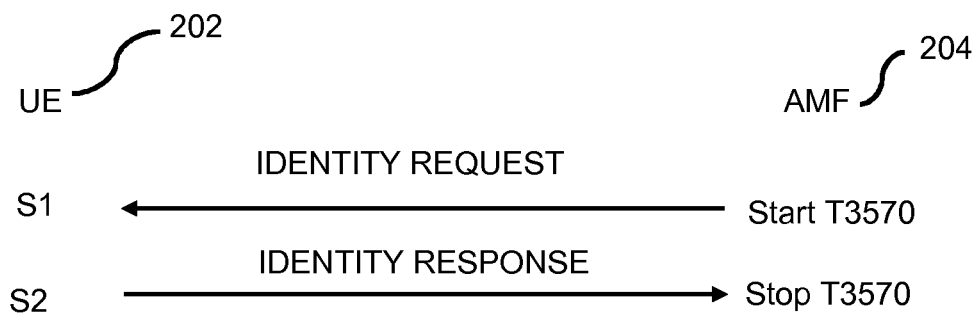
FIG. 2 shows a signalling diagram according to an example.

Referring to FIG. 2, this schematically shows network access identity (NAI) acquisition by an AMF 204 from a UE 202.

The IDENTITY REQUEST message (S1) of the identification procedure requests the UE 202 to send a slice-specific NAI (network access identifier), indicating the S-NSSAI (single network slice selection assistance information), and the mapped S-NSSAI of HPLMN (home public land mobile network), if available in roaming scenarios. The UE 202 can include a slice-specific NAI for the S-NSSAI, and the mapped S-NSSAI of HPLMN (if available in roaming scenarios) in the IDENTITY RESPONSE message (S2).

In some examples, a new 5GMM (5G mobility management) procedure can be used for a same or similar purpose. For example, a new message pair (a SLICE-SPECIFIC IDENTITY REQUEST message and a SLICE-SPECIFIC IDENTITY RESPONSE message; or a SLICE-SPECIFIC AUTHENTICATION COMMAND message and a SLICE-SPECIFIC AUTHENTICATION COMPLETE message) can be used.

It will be noted that although the term "SLICE-SPECIFIC" is used throughout the description as part of message names, for simplicity the term "SLICE" can be used instead.

Whichever message pair is used, the message requesting slice-specific NAI needs to include one or more S-NSSAIs for which NAI is requested. When the UE receives the message from the network requesting slice-specific NAI, the UE NAS layer requests the UE upper layers to provide NAI with the S-NSSAI for each of the S-NSSAIs included in the message from the network. If the upper layers indicate one or more {S-NSSAI and NAI}s, the UE includes the {S-NSSAI and NAI}(s) in the response message. For an S-NSSAI received from the network, if the upper layers do not provide NAI or indicate that there is no NAI available, the UE indicates in the response message "no identity" (together with the S-NSSAI).

There will now be discussed a slice-specific authentication and authorization procedure, with reference to FIG. 3 which is a signaling diagram showing communication between a UE 302 and an AMF 304. Thus in FIG. 3 each of the UE 302 and AMF 304 may be considered to be participating in a slice-specific authentication and authorization procedure.

The purpose of the slice-specific authentication and authorization procedure is to enable the authentication, authorization and accounting server (AAA-S) to authenticate or authorize the upper layers of the UE. The network authenticates the UE using the EAP (Extensible Authentication Protocol) as specified in IETF RFC 3748. EAP has defined four types of EAP messages:

a) an EAP-request message;
b) an EAP-response message;
c) an EAP-success message; and
d) an EAP-failure message.

The EAP-request message is sent from the network (e.g. from AMF 304) to the UE 302 using the SLICE-SPECIFIC AUTHENTICATION COMMAND message of the slice-specific EAP message reliable transport procedure. This is shown at S1 in FIG. 3. Note that at S1 a timer is started. The timer may be a T35xx timer. "35xx" may be any four-digit number which is not already used. A list of already used timer values can be found in subclauses 10.2 and 10.3 of 3GPP TS 24.501.

The EAP-response message to the EAP-request message is transported from the UE 302 to the network (e.g. AMF 304) using the SLICE-SPECIFIC SESSION AUTHENTICATION COMPLETE message of the slice-specific EAP message reliable transport procedure. This is shown at S2 in FIG. 3. At S2 the timer that was started at S1 is stopped.

There can be several rounds of exchange of an EAP-request message and a related EAP-response message for the AAA-S to complete the authentication and authorization of the request for an S-NSSAI. This is generally shown at S3 and S4. The timer is started with each SLICE-SPECIFIC AUTHENTICATION COMMAND message, and stopped with each SLICE-SPECIFIC SESSION AUTHENTICATION COMPLETE message. The timer may be referred to as an authenticator retransmission timer. According to some examples the timer is set to an infinite value.

When the slice-specific authentication of the UE 302 completes successfully then the EAP-success message is sent from the network (e.g. AMF 304) to the UE 302 using the SLICE-SPECIFIC AUTHENTICATION RESULT message of the slice-specific result message transport procedure, for example as shown at S5. S5 in FIG. 3 may be considered to correspond with step 2.*m* in FIG. 1. On the other hand, when the slice-specific authentication of the UE 302 completes unsuccessfully, the EAP-failure message is transported from the network (e.g. AMF 304) to the UE 302 using the SLICE-SPECIFIC AUTHENTICATION RESULT message of the slice-specific result message transport procedure, for example as shown at S6.

Figure 3:
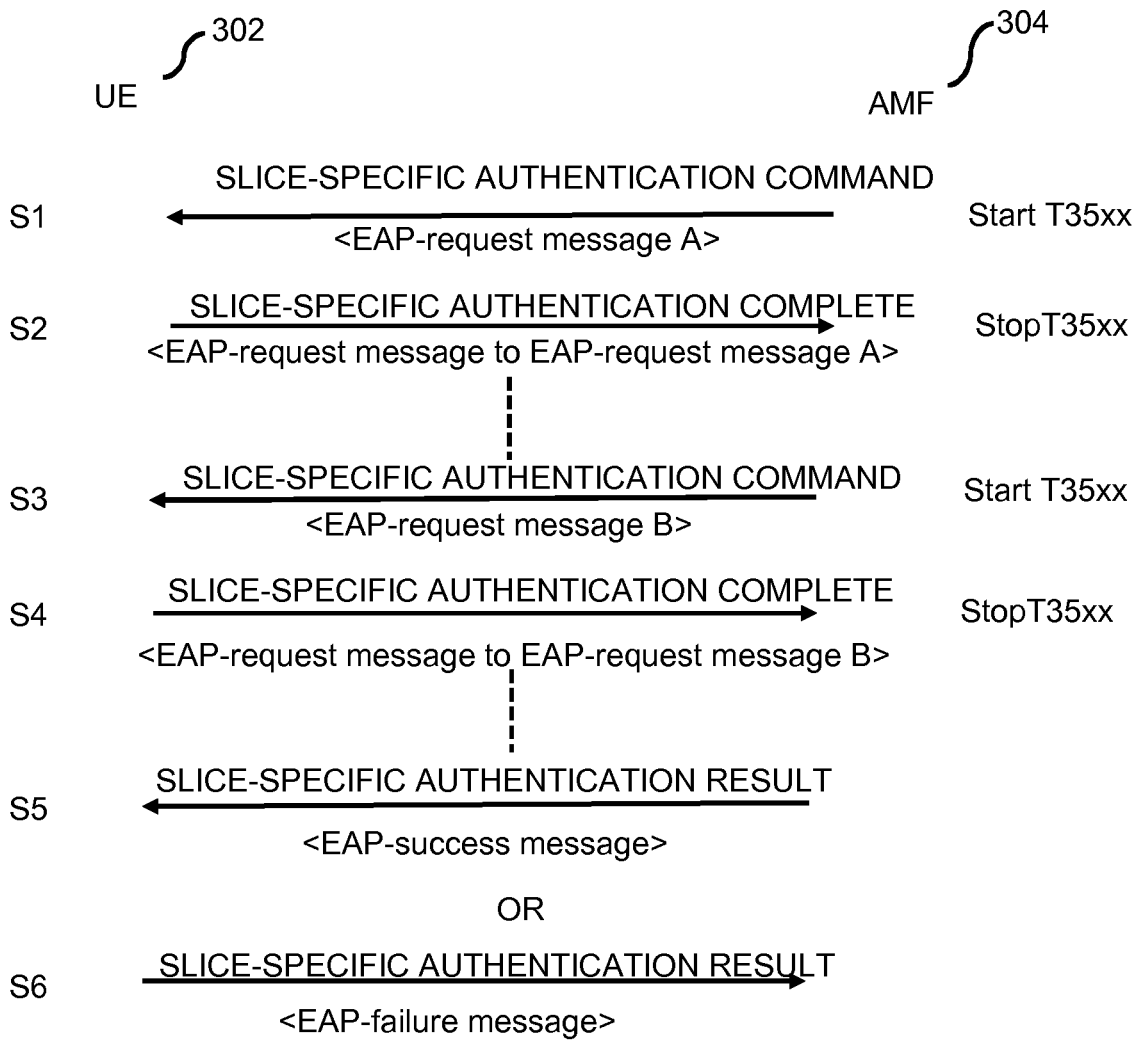
FIG. 3 shows a signalling diagram according to an example.

In order to initiate the slice-specific EAP message reliable transport procedure, the AMF 304 creates the SLICE-SPECIFIC AUTHENTICATION COMMAND message shown at S1 in FIG. 3. The AMF 304 sets the EAP message information element (IE) of the SLICE-SPECIFIC AUTHENTICATION COMMAND message to the EAP-request message provided by the AAA-S.

The AMF sets the S-NSSAI IE of the SLICE-SPECIFIC AUTHENTICATION COMMAND message to the S-NSSAI and the mapped S-NSSAI of HPLMN (if available in roaming scenarios) to which the EAP-request message is related.

The AMF 304 then sends the SLICE-SPECIFIC AUTHENTICATION COMMAND message, and the AMF starts the timer (for example a timer T35xx). This is shown for example at S1 in FIG. 3.

Thus step S1 of FIG. 3 may correspond to step 2.*g* of FIG. 1.

Upon receipt of the SLICE-SPECIFIC AUTHENTICATION COMMAND message at S1, the UE 302 shall send:
a) the EAP-request message received in the EAP message IE; and
b) the S-NSSAI and the mapped S-NSSAI of HPLMN (if available in roaming scenarios) in the S-NSSAI IE;
to the UE upper layers. According to some examples, apart from this action the slice-specific authentication and authorization procedure initiated by the AAA-S is transparent to the 5GMM layer of the UE.

When the UE upper layers provide an EAP-response message associated with the S-NSSAI and the mapped S-NSSAI of HPLMN (if available in roaming scenarios), the UE 302 shall create the SLICE-SPECIFIC AUTHENTICATION COMPLETE message (e.g. S2 in FIG. 3).

The UE 302 sets the EAP message IE of the SLICE-SPECIFIC SESSION AUTHENTICATION COMPLETE message to the EAP-response message.

The UE 302 sets the S-NSSAI IE of the SLICE-SPECIFIC SESSION AUTHENTICATION COMPLETE message to the S-NSSAI and the mapped S-NSSAI of HPLMN (if available in roaming scenarios) associated with the EAP-response message.

The UE then sends the SLICE-SPECIFIC AUTHENTICATION COMPLETE message, as shown at S2. Apart from this action, the slice-specific authentication and authorization procedure initiated by the AAA-S may be transparent to the 5GMM layer of the UE.

Thus S2 in FIG. 3 may correspond with step 2.*h* in FIG. 1.

Upon receipt of a SLICE-SPECIFIC AUTHENTICATION COMPLETE message, the AMF 304 stops the timer (e.g. timer T35xx) which was started at S1, and provides the EAP-response message received in the EAP message IE of the SLICE-SPECIFIC AUTHENTICATION COMPLETE message to the AAA-S associated with the S-NSSAI and the mapped S-NSSAI of HPLMN (if available in roaming scenarios) in the S-NSSAI IE.

Some "abnormal" or "failure" cases will now be considered.

In some examples expiry of the timer (e.g. the T35xx timer of FIG. 3) is considered an abnormal case. In one example, on first expiry of the timer the AMF retransmits the SLICE-SPECIFIC AUTHENTICATION COMMAND message and resets and starts the timer. In some examples this procedure is repeated up to four times, and on the fifth expiry of the timer the AMF aborts the procedure.

There may also be examples where the failure occurs at the UE. For example the following failure or abnormal cases at the UE may be considered:
a) Transmission failure of the SLICE-SPECIFIC AUTHENTICATION COMPLETE message (e.g. S2 in FIG. 3), with TAI (tracking area identity) change from lower layers. According to some examples, if the current TAI is not in the TAI list, the slice-specific authentication and authorization procedure is aborted. A registration procedure for mobility and periodic registration update indicating "mobility registration updating" in the 5GS registration type IE of the REGISTRATION REQUEST message is initiated. In some examples if the current TAI is still part of the TAI list, it is left up to the UE implementation how to re-run the ongoing procedure that triggered the slice-specific authentication and authorization procedure.
b) Transmission failure of SLICE-SPECIFIC AUTHENTICATION COMPLETE message indication (e.g. S2 in FIG. 3), without TAI change from lower layers. In such examples it may be left up to the UE implementation how to re-run the ongoing procedure that triggered the slice-specific authentication and authorization procedure.
c) Slice-specific authentication and authorization procedure and de-registration procedure collision. If the UE receives SLICE-SPECIFIC AUTHENTICATION COMMAND message after sending a DEREGISTRATION REQUEST message, and the access type included in the DEREGISTRATION REQUEST message is the same as the access in which the SLICE-SPECIFIC AUTHENTICATION COMMAND message is received, then the UE shall ignore the SLICE-SPECIFIC AUTHENTICATION COMMAND message and proceed with the de-registration procedure. Otherwise, the UE shall proceed with both procedures.

In some examples, in order to initiate the slice-specific EAP result message transport procedure, the AMF 304 shall create a SLICE-SPECIFIC AUTHENTICATION RESULT message.

The AMF 304 shall set the EAP message IE of the SLICE-SPECIFIC AUTHENTICATION RESULT message to the EAP-success message (as shown at S5 in FIG. 3), or EAP-failure message (as shown at S6 in FIG. 3) provided by the AAA-S.

In examples, the AMF sets the S-NSSAI IE of the SLICE-SPECIFIC AUTHENTICATION RESULT message to the S-NSSAI and the mapped S-NSSAI of HPLMN (if available in roaming scenarios) to which the EAP-success or EAP-failure message is related.

Furthermore, in examples the AMF 304 sets the EAP result IE of the SLICE-SPECIFIC AUTHENTICATION RESULT message to:

a) "success" if the EAP message IE includes the EAP-success message. If (the UE is not in the state 5GMM-REGISTERED-INITIATED and) the S-NSSAI and the mapped S-NSSAI of HPLMN (if available in roaming scenarios) in the S-NSSAI IE is not included in the allowed NSSAI for the current access type, the UE 302 shall include the S-NSSAI and the mapped S-NSSAI of HPLMN (if available in roaming scenarios) in the allowed NSSAI for the current access type. That is, it may be considered that S-NSSAI for the UE is added to a list of any already S-NSSAI for the UE, when the result indicates success of the authentication and authorization procedure. Or;
b) "failure" if the EAP message IE includes the EAP-failure message. If (the UE 302 is not in the state 5GMM-REGISTERED-INITIATED and) the S-NSSAI and the mapped S-NSSAI of HPLMN (if available in roaming scenarios) in the S-NSSAI IE is included in the allowed NSSAI for the current access type, the UE shall remove the S-NSSAI and the mapped S-NSSAI of HPLMN (if available in roaming scenarios) from the allowed NSSAI for the current access type. In addition, in this case, the UE shall locally release a PDU (protocol data unit) session associated with the S-NSSAI, if any. Otherwise, the AMF can notify the session management function (SMF) that the S-NSSAI is not valid at the UE anymore: in this case, the SMF can initiate the network-requested PDU session release procedure for the S-NSSAI. That is, it may be considered that S-NSSAI for the UE is removed from a list of any already allowed S-NSSAI for the UE, when the result indicates failure of the authentication and authorization procedure.

The EAP result IE could be the EAP result field of a different IE, e.g. slice-specific authentication result indication IE.

Alternatively, in some examples the AMF 304 uses different IEs for delivering the EAP-success message and the EAP-failure message. With this approach, the result of the slice-specific authentication and authorization is implicitly indicated to the UE without having a dedicated IE for indicating the EAP result.

In some examples, the AMF indicates "registration requested" in an IE of the SLICE-SPECIFIC AUTHENTICATION RESULT message (S5 FIG. 3) for indication (e.g. slice-specific authentication result indication IE) if the S-NSSAI for which the EAP result is a success requires AMF relocation. The UE 302 is configured to ignore the "registration requested" indication if the EAP result is a failure. If the UE receives the "registration requested" indication with EAP result set to "success", the UE shall not request PDU session establishment for the S-NSSAI until the next registration procedure is completed.

In some examples, upon receipt of a SLICE-SPECIFIC AUTHENTICATION RESULT message (S5 or S6), the UE shall pass:
a) the EAP-success or EAP-failure message received in the EAP message IE; and
b) the S-NSSAI and the mapped S-NSSAI of HPLMN (if available in roaming scenarios) in the S-NSSAI IE;
to the upper layers. Apart from this action, the slice-specific authentication and authorization procedure initiated by the AAA-S is transparent to the 5GMM layer of the UE.

In S5 and S6 the UE may be considered to be receiving a result of the slice-specific authentication and authorization procedure, the result comprising single network slice selection assistance information for the apparatus. Likewise, in S5 and S6 the AMF may be considered to be providing a result of the slice-specific authentication and authorization procedure to the user equipment, the result comprising single network slice selection assistance information for the user equipment.

Thus according to some examples it may be considered that the 5GMM message carrying the EAP result message (e.g. the message of S5 or S6 of FIG. 3) may comprise the following IEs:
EAP-result message;
EAP result (either success or failure); and/or
S-NSSAI (in roaming case: this IE can include both S-NSSAI of the HPLMN and S-NSSAI of the serving PLMN that maps to the HPLMN S-NSSAI subject to the authentication and authorization procedure).

It will also be understood that in examples the information element indicating the result of the slice-specific authentication and authorization procedure is indicated to a mobility management sub-layer of the UE. According to examples the mobility management sub-layer comprises a 5G system mobility management sub-layer.

According to some examples the 5GMM sublayer can update the allowed NSSAI which is managed by the 5GMM sublayer without additional signalling between the UE and the AMF. Furthermore, by updating the NSSAI at the sublayer (e.g. adding or removing), this means that the sublayer can determine whether the EAP authentication has been a success or a failure. This contrasts for example with step 2.*m*. in FIG. 1 where the 5GMM sublayer transparently forwards the EAP success or failure result to the UE upper layers, without the sublayer becoming aware of the result.

In some examples, for reliable transmission of the EAP result message, the AMF may start a new timer when the message in step 2.*a* (of FIG. 1) is sent. The timer is stopped when the message in step 2.*m* is sent. If the timer expires, the AMF sends an indication to the UE that the slice-specific authentication is aborted.

Figure 4:
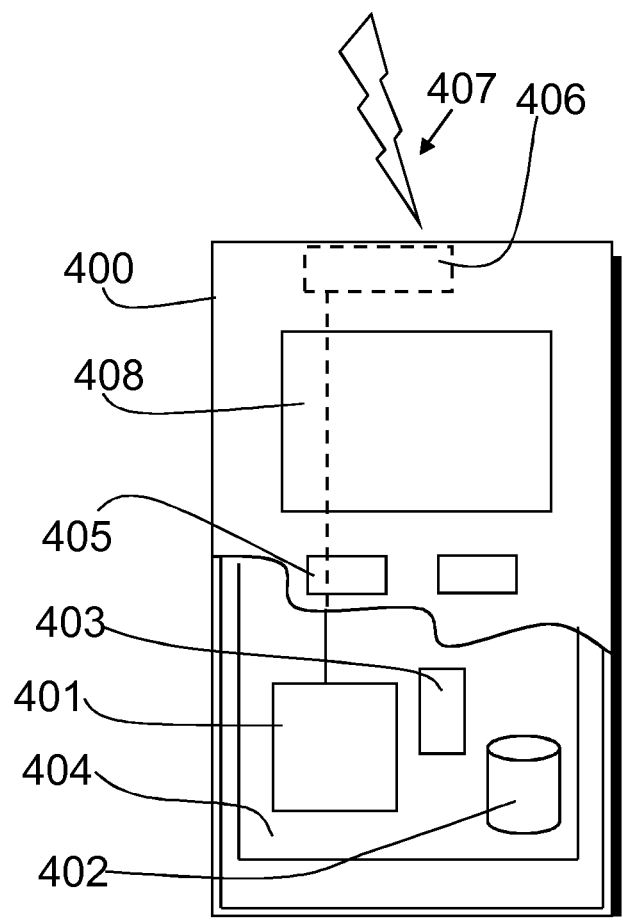
FIG. 4 schematically shows a communication device according to an example.

A possible wireless communication device will now be described in more detail with reference to FIG. 4 showing a schematic, partially sectioned view of a communication device 400. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 400 may receive signals over an air or radio interface 407 via appropriate apparatus for receiving and may transmit signals via appropriate apparatus for transmitting radio signals. In FIG. 4 transceiver apparatus is designated schematically by block 406. The transceiver apparatus 406 may be provided for example by means of a radio part and associated antenna arrangement. The antenna arrangement may be arranged internally or externally to the wireless device.

A wireless device is typically provided with at least one data processing entity 401, at least one memory 402 and other possible components 403 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 404. The user may control the operation of the wireless device by means of a suitable user interface such as key pad 405, voice commands, touch sensitive screen or pad, combinations thereof or the like. A display 408, a speaker and a microphone can be also provided. Furthermore, a wireless communication device may comprise appropriate connectors (either wired or wireless) to other devices and/or for connecting external accessories, for example hands-free equipment, thereto.

Figure 5:
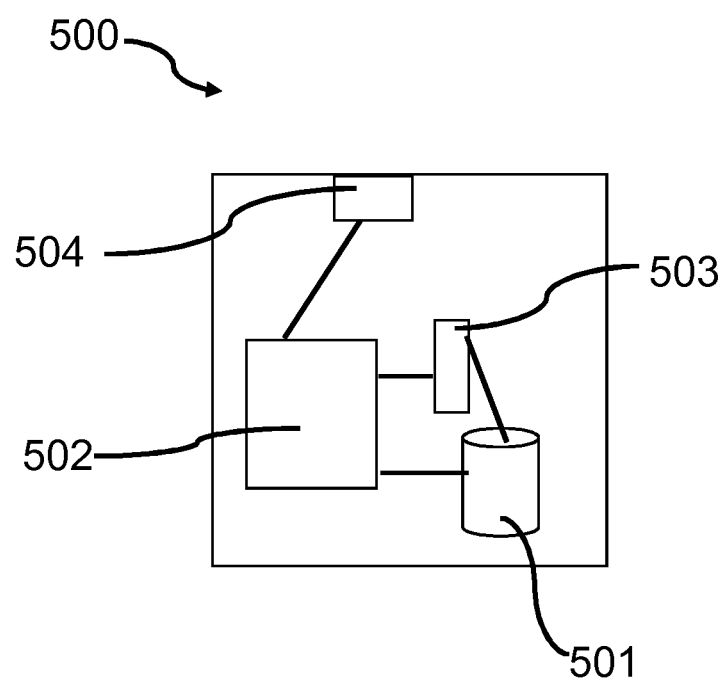
FIG. 5 schematically shows a network apparatus according to an example.

FIG. 5 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, or an apparatus hosting a network function such as that of an AMF. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 500 can be arranged to provide control on communications in the service area of the system. The control apparatus 500 comprises at least one memory 501, at least one data processing unit 502, 503 and an input/output interface 504. Via the interface the control apparatus can be coupled to a receiver and a transmitter of the base station. The receiver and/or the transmitter may be implemented as a radio front end or a remote radio head. For example the control apparatus 500 or processor 501 can be configured to execute an appropriate software code to provide the control functions.

Figure 6:
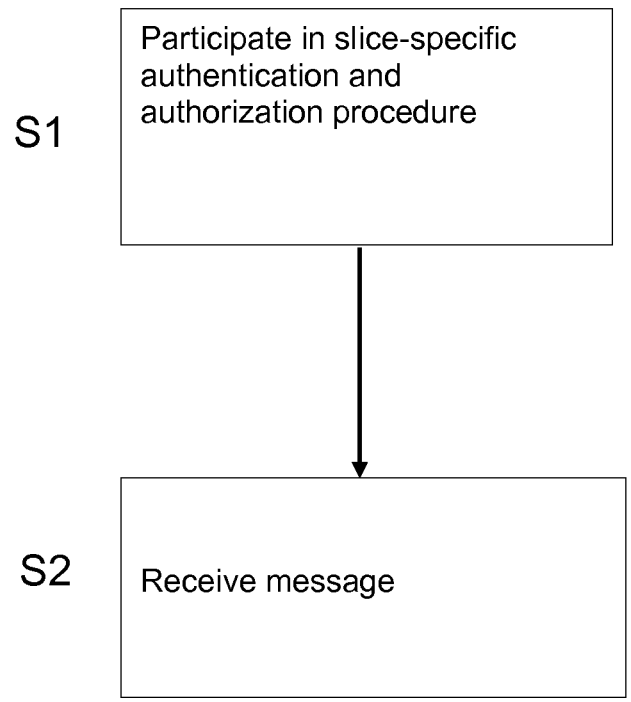
FIG. 6 is a flow-chart schematically showing a method according to an example.

FIG. 6 is a flow-chart schematically showing a method according to an example. The flow-chart of FIG. 6 may be viewed from the perspective of an apparatus. The apparatus may for example be a user equipment.

At S1, the method comprises participating in a slice-specific authentication and authorization procedure for the apparatus.

At S2, the method comprises receiving a message at the apparatus. The message comprises an information element indicating to a mobility management sub-layer of the apparatus a result of the slice-specific authentication and authorization procedure, and the message comprises single network slice selection assistance information for the apparatus.

Figure 7:
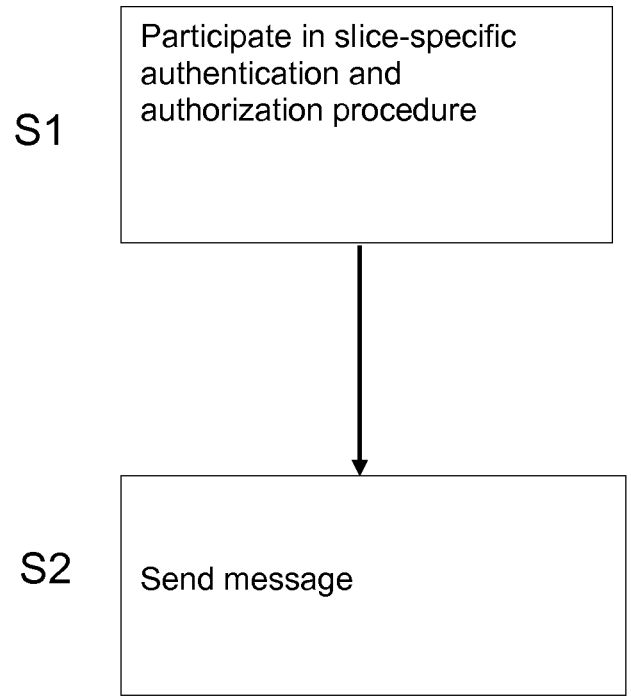
FIG. 7 is a flow-chart schematically showing a method according to an example.

FIG. 7 is a flow-chart schematically showing a method according to an example. The flow-chart of FIG. 7 may be viewed from the perspective of an apparatus. The apparatus may for example be or be hosting an AMF.

At S1, the method comprises participating in a slice-specific authentication and authorization procedure for a user equipment.

At S2, the method comprises sending a message to the user equipment. The message comprises an information element indicating to a mobility management sub-layer of the user equipment a result of the slice-specific authentication and authorization procedure, and the message comprises single network slice selection assistance information for the user equipment.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
at least one processor; and
at least one memory comprising computer program code, the at least one memory and computer program code configured, with the at least one processor, to cause the apparatus at least to:
participate, for a network slice, in a slice-specific authentication and authorization procedure for the apparatus; wherein the participating comprises:
receiving a SLICE-SPECIFIC AUTHENTICATION COMMAND message at the apparatus;
creating a SLICE-SPECIFIC AUTHENTICATION COMPLETE message;
sending the SLICE-SPECIFIC AUTHENTICATION COMPLETE message; and
receiving a SLICE-SPECIFIC AUTHENTICATION RESULT message at the apparatus, the SLICE-SPECIFIC AUTHENTICATION RESULT message comprising an information element indicating to a mobility management sub-layer of the apparatus a result of the slice-specific authentication and authorization procedure, and the message comprising single network slice selection assistance information for the apparatus, the single network slice selection assistance information relating to the network slice; and
wherein the at least one memory and computer program code are further configured, with the at least one processor, to cause the apparatus at least to:
when the SLICE-SPECIFIC AUTHENTICATION COMMAND message is received after sending a DEREGISTRATION REQUEST message and when an access type included in the DEREGISTRATION REQUEST message is the same as an access type for which the SLICE-SPECIFIC AUTHENTICATION COMMAND message is received, proceed with a deregistration procedure and ignoring the SLICE-SPECIFIC AUTHENTICATION COMMAND message.

2. An apparatus according to claim 1, wherein the result of the slice-specific authentication and authorization procedure indicates success or failure of the authentication and authorization procedure.

3. An apparatus according to claim 2, wherein the at least one memory and computer program code are further configured, with the at least one processor, to cause the apparatus at least to:
when the result indicates success of the authentication and authorization procedure, add the single network slice selection assistance information for the apparatus to a list of any already allowed network slice selection assistance information for the apparatus.

4. An apparatus according to claim 1, wherein the at least one memory and computer program code are further configured, with the at least one processor, to:
associate the single network slice selection assistance information with a mapped single network slice selection assistance information of a Home Public Land Mobile Network, when the apparatus is roaming.

5. An apparatus, comprising:
at least one processor; and
at least one memory comprising computer program code, the at least one memory and computer program code configure, with the at least one processor, to cause the apparatus at least to:
participate, for a network slice, in a slice-specific authentication and authorization procedure for a user equipment; wherein the participating comprises:
sending a SLICE-SPECIFIC AUTHENTICATION COMMAND message;
starting a timer;
stopping the timer when a SLICE-SPECIFIC AUTHENTICATION COMPLETE message is received; and
sending a SLICE-SPECIFIC AUTHENTICATION RESULT message to the user equipment, the SLICE-SPECIFIC AUTHENTICATION RESULT message comprising an information element indicating to a mobility management sub-layer of the user equipment a result of the slice-specific authentication and authorization procedure, and the message comprising single network slice selection assistance information for the user equipment the single network slice selection assistance information relating to the network slice; and
wherein the at least one memory and computer program code are further configured, with the at least one processor, to cause the apparatus at least to:
in case the timer expires, retransmit the SLICE-SPECIFIC AUTHENTICATION COMMAND message and reset the timer.

6. An apparatus according to claim 5, wherein the at least one memory and computer program code are further configured, with the at least one processor, to cause the apparatus at least to:
provide mapped single network slice selection assistance information of a home public land mobile network for the user equipment, when the user equipment is roaming.

7. An apparatus according to claim 5, wherein the result of the slice-specific authentication and authorization procedure indicates success or failure of the authentication and authorization procedure.

8. An apparatus according to claim 5, wherein the at least one memory and computer program code are further configured, with the at least one processor, to cause the apparatus at least to:
when the result indicates success of the authentication and authorization procedure, cause adding the single network slice selection assistance information for the user equipment to a list of any already allowed network slice selection assistance information for the user equipment.

9. An apparatus according to claim 5, wherein the at least one memory and computer program code are further configured, with the at least one processor, to cause the apparatus at least to:
when the result indicates failure of the authentication and authorization procedure, cause removing the single network slice selection assistance information for the user equipment from a list of any already allowed network slice selection assistance information for the user equipment.

10. A method comprising:
participating, for a network slice, in a slice-specific authentication and authorization procedure for an apparatus; wherein the participating comprises:
receiving a SLICE-SPECIFIC AUTHENTICATION COMMAND message at the apparatus;
creating a SLICE-SPECIFIC AUTHENTICATION COMPLETE message;
sending the SLICE-SPECIFIC AUTHENTICATION COMPLETE message; and
receiving a SLICE-SPECIFIC AUTHENTICATION RESULT message at the apparatus, the SLICE-SPECIFIC AUTHENTICATION RESULT message comprising an information element indicating to a mobility management sub-layer of the apparatus a result of the slice-specific authentication and authorization procedure, and the message comprising single network slice selection assistance information for the apparatus, the single network slice selection assistance information relating to the network slice;
wherein the method further comprises, when the SLICE-SPECIFIC AUTHENTICATION COMMAND message is received after sending a DEREGISTRATION REQUEST message and when an access type included in the DEREGISTRATION REQUEST message is the same as an access type for which the SLICE-SPECIFIC AUTHENTICATION COMMAND message is received, proceeding with a deregistration procedure and ignoring the SLICE-SPECIFIC AUTHENTICATION COMMAND message.

11. A method according to claim 10, wherein the result of the slice-specific authentication and authorization procedure indicates success or failure of the authentication and authorization procedure.

12. A method according to claim 11, further comprising, when the result indicates success of the authentication and authorization procedure, adding the single network slice selection assistance information for the apparatus to a list of any already allowed network slice selection assistance information for the apparatus.

13. A method according to claim 10, further comprising associating the single network slice selection assistance information with a mapped single network slice selection assistance information of a Home Public Land Mobile Network, when the apparatus is roaming.

14. A method, comprising:
participating, for a network slice, in a slice-specific authentication and authorization procedure for a user equipment; wherein the participating comprises:
sending a SLICE-SPECIFIC AUTHENTICATION COMMAND message;
starting a timer;
stopping the timer when a SLICE-SPECIFIC AUTHENTICATION COMPLETE message is received; and
sending a SLICE-SPECIFIC AUTHENTICATION RESULT message to the user equipment, the SLICE-SPECIFIC AUTHENTICATION RESULT message comprising an information element indicating to a mobility management sub-layer of the user equipment a result of the slice-specific authentication and authorization procedure, and the message comprising single network slice selection assistance information for the user equipment the single network slice selection assistance information relating to the network slice;
wherein the method further comprises:
in case the timer expires, retransmitting the SLICE-SPECIFIC AUTHENTICATION COMMAND message and resetting the timer.

15. A method according to claim 14, further comprising providing mapped single network slice selection assistance information of a home public land mobile network for the user equipment, when the user equipment is roaming.

16. A method according to claim 14, wherein the result of the slice-specific authentication and authorization procedure indicates success or failure of the authentication and authorization procedure.

17. A method according to claim 14, further comprising, when the result indicates success of the authentication and authorization procedure, causing adding the single network slice selection assistance information for the user equipment to a list of any already allowed network slice selection assistance information for the user equipment.

18. A method according to claim 14, further comprising, when the result indicates failure of the authentication and authorization procedure, causing removing the single network slice selection assistance information for the user equipment from a list of any already allowed network slice selection assistance information for the user equipment.

* * * * *